United States Patent Office 3,374,000
Patented Mar. 19, 1968

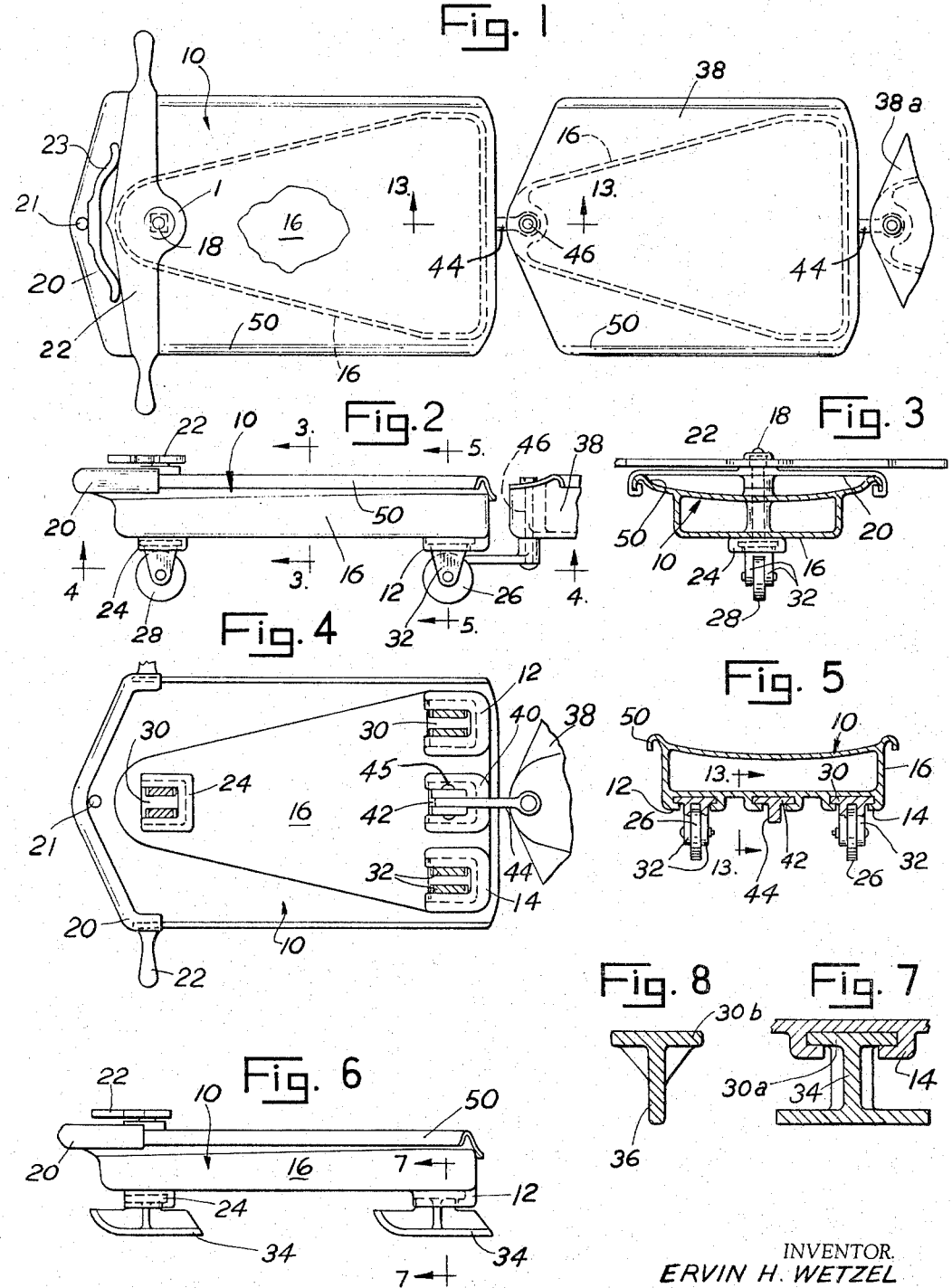

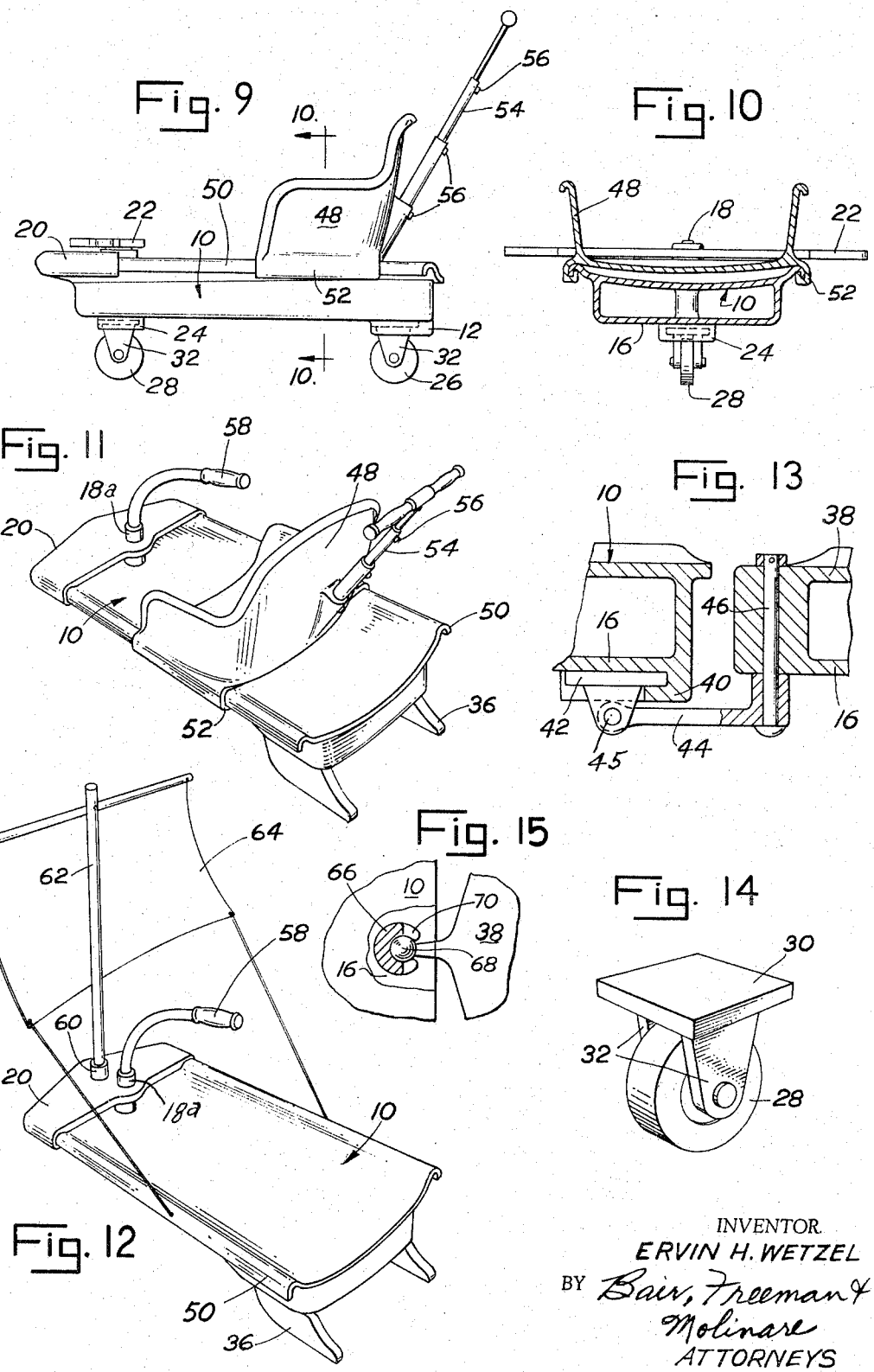

3,374,000
COMBINATION VEHICLE
Ervin H. Wetzel, 1440 Lawrence Ave.,
Lake Forest, Ill. 60045
Filed Apr. 25, 1966, Ser. No. 544,858
2 Claims. (Cl. 280—8)

ABSTRACT OF THE DISCLOSURE

A vehicle for coasting or the like has a supporting platform provided with means for removably associating therewith mobil supporting units such as wheel units or runner units. A simple socket arrangement is provided for this purpose. For enlarging the vehicle a trailer unit is provided connectable with the basic vehicle.

---

This invention relates to a combination vehicle which can be used for a number of different purposes and readily converted for different uses.

One object of the invention is to provide a vehicle which has interchangeable sets of mobile supporting units such as wheel units or runner units for operation on sidewalks, pavements and the like, or on ice or snow.

Another object is to provide a quickly operable and convenient means for changing from wheels to runners, the vehicle comprising a platform having forwardly opening sockets from which wheel units may be removed and runner units substituted, or vice versa, as the seasons dictate.

Still another object is to provide a basic vehicle which is small and suitable for babies and young children. It is provided with a removable seat and collapsible push bar unit so that the mother of the child can readily push the vehicle when the push bar is extended, or collapse the push bar for storage when the vehicle is not in use.

A further object is to provide the basic vehicle adaptable for the use of small children for coasting, and the like.

A further object is to provide a trailer readily attachable to the vehicle so as to extend its length for use by the child as he becomes older, and for making up a "train" comprising the vehicle and a plurality of such trailers if desired.

An additional object is to provide means for supporting a mast and sail on the vehicle to make the same self-propelling whenever wind is available for that purpose.

With these and other objects in view, my invention consists in the construction, arrangement and combination of the various parts of my combination vehicle, whereby the objects above contemplated are attained, as hereinafter more fully set forth, pointed out in my claims and illustrated in detail on the accompanying drawings, wherein:

FIG. 1 is a plan view of a vehicle embodying my invention and shows the basic vehicle with trailers attached thereto;

FIG. 2 is a side elevation of a portion of FIG. 1 showing the basic vehicle and the front portion of a trailer;

FIG. 3 is a vertical sectional view on the line 3—3 of FIG. 2;

FIG. 4 is a bottom plan view partially on the section line 4—4 of FIGS. 2, and also shows the basic vehicle and the front portion of a trailer;

FIG. 5 is a vertical sectional view on the line 5—5 of FIG. 2;

FIG. 6 is a side elevation similar to FIG. 2 showing sled runners instead of wheels for supporting my combination vehicle;

FIG. 7 is an enlarged vertical sectional view on the line 7—7 of FIG. 6 showing a runner for snow;

FIG. 8 is a similar sectional view showing a runner for ice;

FIG. 9 is a side elevational showing a seat mounted on the vehicle;

FIG. 10 is a vertical sectional view on the line 10—10 of FIG. 9;

FIG. 11 is a perspective view of the vehicle shown in FIG. 9 except mounted on ice runners instead of wheels and showing a tiller handle for steering instead of a tiller bar as in FIG. 1;

FIG. 12 is a perspective view showing a sail mounted on the vehicle;

FIG. 13 is an enlarged sectional view on the line 13—13 of FIG. 1 to show a swivel connection between the vehicle and a trailer;

FIG. 14 is a perspective view of a wheel unit; and

FIG. 15 is a plan view of a modification.

On the accompanying drawings I have used the reference numeral 10 to indicate in general a platform which may be formed of any suitable material, such as molded from plastic material or formed of sheet metal, or may be in the form of a die casting or the like. Preferably, the platform has a concave upper surface as shown in FIGS. 3 and 5 for comfort of the user when sitting or lying on the vehicle.

A pair of forwardly opening sockets 12 and 14 are provided on the lower surface of the platform adjacent the rear end thereof, and may be formed on a false bottom member 16 if the device is molded of plastic, the platform 10 and the bottom member 16 thereby serving to provide a reinforced structure of boxlike character suitable for molding in relatively thin dimensions of plastic material.

Adjacent the front end of the platform 10 and false bottom member 16 is a vertical steering spindle 18 journaled in suitable hublike formations as illustrated in FIG. 3, one of which may be formed on a steering spindle support 20 at the forward end of the platform 10. A tiller bar 22 is suitably secured to the spindle 18 and may be oscillated by hands or feet of the user in an obvious manner for steering purposes. The lower end of the steering spindle 18 is provided with a forwardly opening socket 24.

A pair of rear wheels 26 and a front wheel 28 are provided and each wheel is part of a wheel unit (see FIG. 14) comprising the wheel itself, a rectangular base 30 and a pair of ears 32 in which the wheels are journaled and, preferably, provided with ball or roller bearings. The rectangular bases 30 are adapted to be slid rearwardly into the forwardly opening sockets 12, 14 and 24 or to be removed therefrom, whereupon runners 34 for snow as shown in FIGS. 6 and 7 or 36 for ice, as shown in FIG. 8, may be substituted.

When formed of plastic material, the tolerances may be held close enough that there is a good frictional fit of the bases 30 (and 30a and 30b of the runners 34 and 36 respectively) in the forwardly opening sockets 12, 14 and 24, and since the direction of movement of the vehicle tends to force the bases into the sockets there is no problem with them accidentally coming out. Also, the sockets and bases may be slightly tapered along their contacting surfaces to provide a wedging fit, if desired. The foregoing described parts constitute a basic vehicle in accordance with my invention.

I provide one or more trailers 38 which may be readily connected to the vehicle and to each other to form a "train" (or disconnected when desired). For this purpose an additional forwardly opening socket 40 is provided to receive a base 42 of a draw bar connection which includes a bar 44 pivoted on a horizontal axis 45 to the base 42 as shown in FIG. 13 and on a vertical axis 46 to the trailer 38. The trailer is provided with rear wheels the same as the rear wheels of the basic vehicle and a second trailer 38a may be connected to the first one and of course, as many additional trailers can be added as desired. The wheel units on the trailers are the same as shown in FIG. 14 and removable so that runner units can be substituted in the same manner as for the basic vehicle.

By providing a trailer, the relatively small basic vehicle, when outgrown, may have the trailer added and is then suitable for larger children so that my combination vehicle can keep pace with the growth of a child from babyhood through teenage and as long as the vehicle is useful to a child, regardless of his size. During babyhood, a seat 48 shown in FIGS. 9, 10 and 11 may be provided which can be readily slid into position on the platform 10. It will be noted that the platform has curled side edges 50 which form hand grips for a child sitting on the vehicle and using his feet on the tiller bar 22. The seat 48 may have channels 52 to slide onto these curled side edges as shown in FIG. 10.

The seat 48 is provided with a collapsible push bar 54 which may be extended as shown in FIGS. 9 and 11 for use or collapsed into a stored position when desired inasmuch as the push bar is of telescopic character. Suitable latches 56 may be provided to hold the push bar in extended position. As shown in FIG. 11 a tiller handle 58 may be substituted for the tiller bar 22, if desired, the steering spindle 18 being shown as having a hub 18a to receive the tiller handle.

For the purpose of pulling the basic vehicle (and trailers if desired) the forward end may have a perforation 21 to receive a hook on a rope or chain. As shown in FIG. 1, the tiller bar 22 may be engaged by the two ends of a centering spring 23 which has its center portion anchored to the steering spindle support 20. This is particularly desirable when "belly flopping" on the vehicle in order to have the steerable front wheel 28 normally aligned with the fore-and-aft axis of the vehicle.

FIG. 12 shows a further modification in which the steering spindle support 20 is provided with a mast socket 60 to receive the lower end of a mast 62 having a sail 64 mounted thereby on the vehicle. Thus, the vehicle may be propelled by wind and is thereupon especially suitable for ice yachting.

In FIG. 15 I show a modification of the trailer-to-basic vehicle connection in which a spherical socket 66 is provided between the platform 10 and the false bottom member 16 to receive a ball 68 of the trailer 38. The socket may have resilient fingers 70 to retain the ball or a positive lock may be used for this purpose. This type of connection does not permit as much relative movement between the trailer and the basic vehicle and therefore is more suitable for using the two together by older boys for "belly flopping" coasting when it is desirable to hold the basic vehicle by one hand and the trailer by the other hand.

From the foregoing disclosure, it will be obvious that I have provided a vehicle suitable for either summer or winter weather conditions. It is readily converted for either use, and in the wintertime for use on either ice or snow.

The vehicle is fully adaptable for use starting with a small child and ranging into the adult. It has utility in the heat of summer and in the cold of winter so as to be adapted for full year-round use in any hemisphere or geographical location.

My combination vehicle is economical as it eliminates the purchase of a sled for winter and a wagon for summer. It is a starter for the one year old and will become his lifetime companion as he disposes of the child's seat and odds one or more trailers. It is particularly suitable when using trailers as a "train" behind a self-propelled lawn mower or small garden tractor or the like and as such should have considerable appeal to most families.

Some changes may be made in the construction and arrangement of the parts of my combination vehicle without departing from the real spirit and purpose of my invention, and it is my intention to cover by my claims any modified forms of structure or use of mechanical equivalents which may reasonably be included within their scope.

I claim as my invention:

1. In a vehicle of the character described, a supporting platform adapted to travel in a predetermined direction, a pair of sockets on the lower surface thereof adjacent the rear end of said platform and opening forwardly in relation to said direction, a vertically steering spindle journaled in said platform adjacent the front end thereof, a socket carried thereby and opening forwardly in relation to said direction, a set of mobile supporting units having mounting means removably received in said sockets, and steering means for said spindle said vertical steering spindle being provided with a tiller bar, and a leaf spring type of centering means is provided for said tiller bar having its ends engaged therewith and its central portion anchored to said supporting platform.

2. In a vehicle of the character described, a supporting platform adapted to travel in a predetermined direction, a pair of sockets on the lower surface thereof adjacent the rear end of said platform and opening forwardly in relation to said direction, a vertical steering spindle journaled in said platform adjacent the front end thereof, a socket carried thereby and opening forwardly in relation to said direction, a set of mobile supporting units having mounting means removably received in said sockets, a steering means for said spindle, said platform having an additional socket adjacent said pair of sockets and opening forwardly in relation to said direction, a trailer having means of connection with said vehicle including an element removably received in said additional socket and removable therefrom only in said forward direction and a connecting link having one end pivoted to said element and its other end pivoted to said trailer adjacent the front end thereof, one of said pivots having a vertical axis and the other a horizontal axis which permit free change of angular relationship in both the vertical and horizontal plane between said trailer and said vehicle said trailer having a pair of sockets on the lower surface thereof adjacent the rear end of the trailer and opening forwardly in relation to said direction, and a pair of mobile supporting units having mounting means removably received in said last mentioned sockets.

References Cited

UNITED STATES PATENTS

| | | | |
|---|---|---|---|
| 1,409,501 | 3/1922 | Volz | 280—8 |
| 1,477,513 | 12/1923 | McNeill | 280—8 |
| 1,546,805 | 7/1925 | Pierre | 280—16 |
| 2,155,714 | 4/1939 | Kidder | 280—23 |
| 2,219,905 | 10/1940 | Prickman | 280—8 |
| 2,583,191 | 1/1952 | Voorhees | 280—494 |
| 2,607,604 | 8/1952 | Nelson | 280—504 |
| 2,790,196 | 4/1957 | Rideout et al. | 16—30 |
| 3,026,121 | 3/1962 | Ellam | 280—16 |
| 3,145,029 | 8/1964 | Ollanketo | 280—16 |

BENJAMIN HERSH, *Primary Examiner.*

L. D. MORRIS, *Assistant Examiner.*